Nov. 28, 1961     J. S. ROBERTS ET AL     3,010,235
ILLUMINATION PANEL DEVICE
Filed Feb. 3, 1960
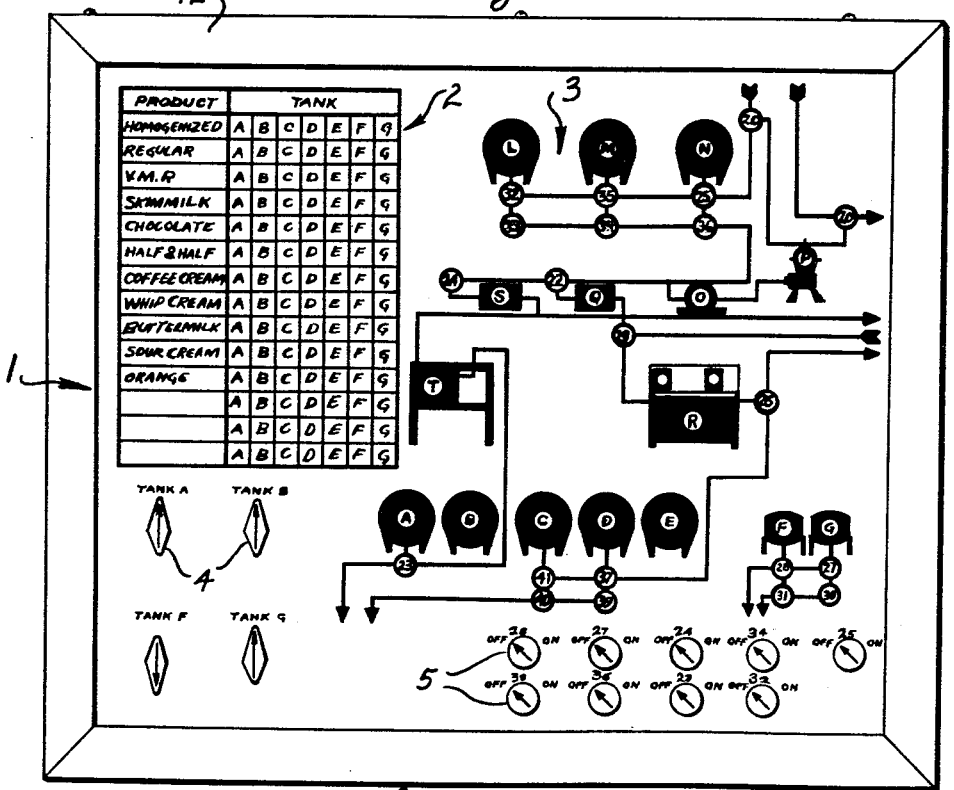
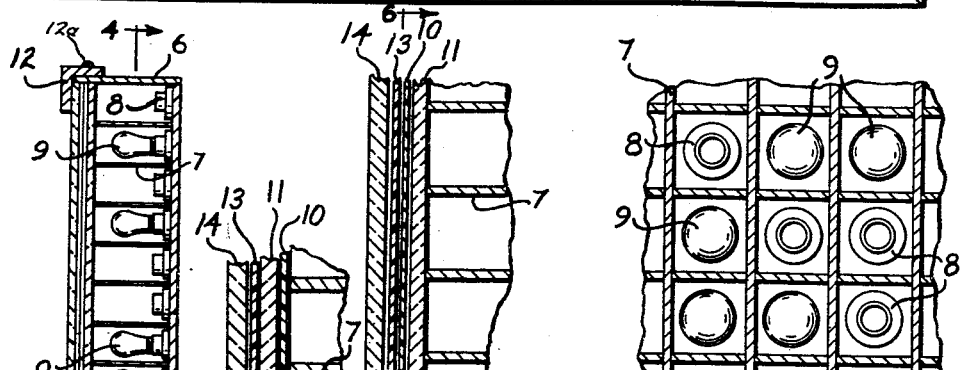
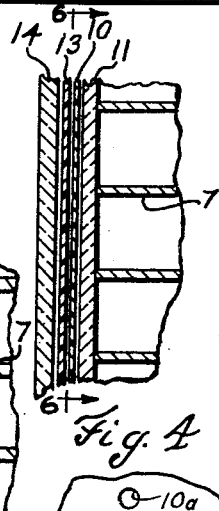
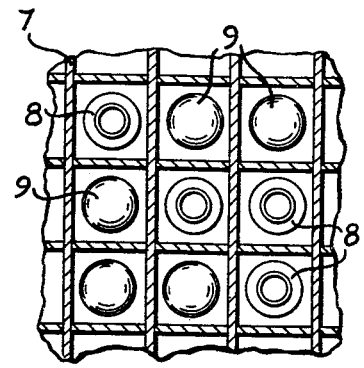
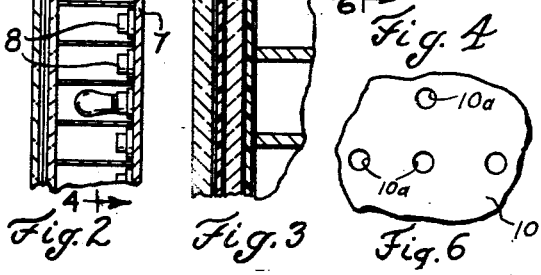
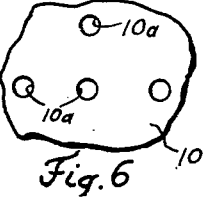

United States Patent Office 3,010,235
Patented Nov. 28, 1961

3,010,235
ILLUMINATION PANEL DEVICE
James S. Roberts, Milwaukee, and Elmer S. Welch, Thiensville, Wis., assignors, by mesne assignments, to Milwaukee Chaplet & Mfg. Company, Inc., Milwaukee, Wis., a corporation of Wisconsin
Filed Feb. 3, 1960, Ser. No. 6,498
1 Claim. (Cl. 40—132)

This invention relates to an illuminated indicator and control panel for carrying out a series of steps in a plant process.

It is an object of this invention to provide an illumination panel which will indicate the plant flow process that is taking place and the particular control elements that are being used to accomplish this process.

It is a further object of this invention to provide an illumination panel having a process flow defining film and its correlated opaque sheet which can be readily changed to facilitate it being used for any one of a plurality of installations.

The invention further provides a combination of a light localizing means, a light indication defining means and a process flow film which together produce an accurately formed and easily readable picture of the particular process being carried out at any particular time.

A more specific aspect of the invention provides a flow process indicating film having correlated product-tank and flow charts.

Other objects and advantages will be apparent from the following description when taken in conjunction with the accompanying drawings in which:

FIGURE 1 illustrates the front view of an illumination panel embodying the present invention;

FIGURE 2 is a cross-section of the panel showing the light means used in the illumination device;

FIGURE 3 is a partial view in more detail of the panel members;

FIGURE 4 is a modification of that shown in FIGURE 3;

FIGURE 5 is a partial section view taken along lines 4—4 of FIGURE 2; and

FIGURE 6 is a fragmentary, front elevational view on line 6—6 in FIGURE 4, showing the openings in the opaque member.

Referring to FIGURE 1, there is illustrated a panel 1 in which there is located in the upper left hand portion a grid chart 2 for indicating the presence of any one of a list of products and their location in any one of a series of tanks A through G, for example. The particular illuminating means for lighting up the desired squares formed on the grid chart will be described hereinafter in greater detail.

The right hand portion of the panel contains a plant process flow chart 3 including various devices which control the flow of the product through the system to the various tanks A through G. The particular devices shown include illuminable circles identified by certain non-consecutive numbers between 20 and 41, which represent various control valves. Located beneath the grid chart 2 there are a plurality of switches 4 and beneath the flow chart 3 are a plurality of switches 5. These switches are employed to actuate the actual operating valves (not shown) and when they do also light up their respective and correspondingly identified portions of the panel to indicate the location of the various liquids and the control valves and elements that are regulating the flow of these liquids.

Referring now to FIGURES 2 and 5, it is noted that the illumination panel device consists of a housing 6 in which is located an egg-crate structure 7 which extends across the width and height of the device. In each compartment formed by the egg-crate structure 7 there is located a light socket 8 containing a bulb 9. However, if certain areas of the panel device are not being used for a particular grid and flow chart, then bulbs in the unused areas need not be inserted therein. The egg-crate structure 7 which extends across the panel device performs the important function of preventing light "spill-over" from the area of any one compartment containing a lighted bulb. In other words the structure 7 generally confines the light of any one bulb to the respective compartment area in front of that bulb and thereby localizes the light furnished by the bulbs. This action together in combination with the action of other elements of the device, to be described, provides a very versatile device having accurately formed indications.

The wiring for the various lamps are not shown in detail since it is not important to an understanding of the present invention. The display panel is maintained in assembled relationship adjacent the lamps by channels 12, one of which is removable by screws 12a.

Now turning to FIGURE 3 there is shown in detail the display portion of the panel through which the light is directed to provide the desired illumination. Located in front of the egg-crate structure 7 is an opaque sheet 10 which defines predetermined openings 10a (FIGURE 6) through which light is directed. The location and numbers of these openings 10a are arranged to coincide with the areas desired to be illuminated on the particular film 13 to be described. The interchangeable opaque members 10 (only one shown) thus serve to define the shape of the transmitted light, and in combination with the localized light furnished by the egg-crate structure acts to produce an accurate light indication.

Next to the sheet 10 is a diffuser 11 made of a translucent material which softens the light within the above mentioned light indication. As shown in FIGURE 4, this diffuser may be located in front of the opaque member 10.

In front of the diffuser 11 is a film 13 of the type shown in FIGURE 1 which indicates the various elements making up the control process taking place. A plexiglass sheet 14 or other transparent sheet is located in front of the film 13 to protect and shield it. These films 13 (only one shown) are readily interchangeable together with their respective opaque members, so as to define any one of a number of flow process operations for a plant. To illustrate a different process flow, it is only necessary to change the film and its corresponding opaque sheet.

The particular film illustrated which contains a product-tank grid chart and the correlated process flow chart has proven to be particularly versatile, easy for the operator to read and understand, and gives an immediate and complete view of any phase of the operation being carried on at any time and the control elements used to do so.

This is a continuation-in-part application of our patent application Serial Number 801,899, filed March 25, 1959, and entitled "Illumination Panel Device," which has been abandoned.

Various modes of carrying out the invention are contemplated as being within the scope of the following claim particularly pointing out and distinctly claiming the subject matter which is regarded as the invention.

What is claimed and described to be secured by Letters Patent is:

An illumination panel device comprising in combination a box-like housing having an egg-crate structure defining an orderly series of open-ended compartments, means associated with each of said compartments for placing a light source therein, an information panel assembly disposed across said open-ended compartments, and means for detachably securing said panel assembly to said housing, said assembly consisting of an innermost interchangeable opaque sheet containing a plurality of apertures and being adapted for positioning adjacent said open-ended compartments so that each of said apertures is in alignment with a light source, an interchangeable information film having light-transmitting indications and being correlated with said opaque sheet by the alignment of said light-transmitting indications with the apertures in said opaque sheet, a back light diffusing sheet intermediate said opaque sheet and said information film, and an outermost protective transparent sheet covering said information film, whereby a sharply defined beam of light can be selectively transmitted through said apertures to accurately illuminate the indications on said information film which are aligned with said apertures.

References Cited in the file of this patent

UNITED STATES PATENTS

| | | |
|---|---|---|
| 450,615 | Delany | Apr. 21, 1891 |
| 1,452,455 | Bell et al. | Apr. 17, 1923 |
| 1,894,512 | Eschenbach | Jan. 17, 1933 |
| 2,068,827 | Tompkins | Jan. 26, 1937 |